Figure 1:
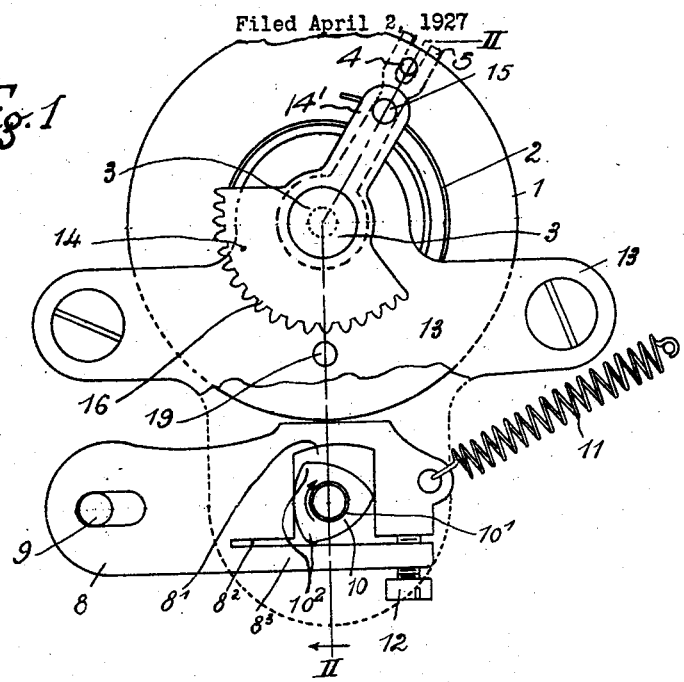

Oct. 25, 1927.  
G. MOMBUR  
1,647,115  
DEVICE FOR INDICATING SPEED  
Filed April 2, 1927

Inventor  
Georges Mombur  
By Atty.

Patented Oct. 25, 1927.

1,647,115

UNITED STATES PATENT OFFICE.

GEORGES MOMBUR, OF VERSAILLES, FRANCE.

DEVICE FOR INDICATING SPEED.

Application filed April 2, 1927, Serial No. 180,568, and in France March 27, 1926.

My invention relates to a speedometer or speed indicating device.

The present invention has for its object to provide improved apparatus of this nature which, while comparatively simple and inexpensive to manufacture, is nevertheless reliable in operation.

According to the present invention a spring-ballasted speed-measuring element receives a succession of slight constant movements separated from each other by time intervals which are a function of the speed of the moving body, which speed is to be measured. With every change of speed a positive or a negative displacement of said measuring system will occur depending upon whether the frequency of the positive intermittent impulses increases or decreases.

The mode of execution of the apparatus based on the above principle is as follows:—

A so-called "measuring" wheel constituting in effect a torsion pendulum is mounted upon a spindle connected to the pivot of the index, it is acted upon by a spiral spring which tends to draw it back in a position corresponding to zero. An appropriate mechanism connected with the moving body of which the speed is to be measured, produces at close intervals a succession of positive angular displacements of constant value in the measuring wheel, the duration of said displacements being a function of the speed of the moving body. After each positive angular displacement the measuring system is disengaged by the driving or propelling system and tends to come back in its first position under the action of the spiral spring. The duration of this negative oscillatory motion is the interval of time dividing two positive actions of the intermittent driving mechanism and is consequently inversely proportionate to the speed of the moving body, i. e., the body whose speed is to be measured.

It will therefore be understood that at increasing speeds the duration of the negative oscillatory motions interpolated between two positive actions will continuously become shorter and that consequently the corresponding angular negative displacement will have a decreasing value. This will result in a constant forward movement of the measuring system. For any given speed a position of equilibrium will be reached, the constant positive oscillatory motions being at such time equal to the negative oscillatory motions caused by the existing tension of the spiral spring. It will be obvious that the spring tension increases as the measuring wheel is rotated positively, i. e., in the direction of higher speed indications, and consequently even though the free periods of the wheel become shorter with increasing speeds, the spring will cause negative oscillations. The index will always move to the zone where, because of the existing spring tension, the positive and negative oscillations are equal.

On the other hand, the duration of the negative oscillatory motions and the value of said motions will increase progressively with decreasing speed. The uniform positive oscillatory motions occurring at lower frequency will result in a progressive recoil of the measuring system to the foresaid position of equilibrium. The utilization of slight positive angular displacements having a proper frequency range allow the construction of an apparatus which is capable of giving indications rapidly and almost without interruption.

The distance registering means coupled with the speed indicator according to the present invention are actuated by a rotary system connected, by means of an appropriate reducing gear, to the driving mechanism of the measuring system.

In the drawings—

Figure 2:
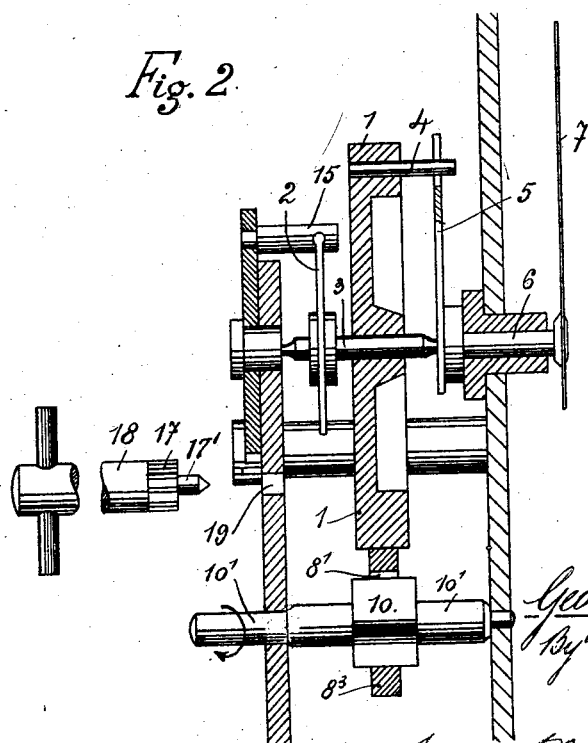

Fig. 1 shows in rear elevation the mechanism of the indicator driven mechanically, and Fig. 2 is a vertical axial sectional view of same the section being taken along the line II—II of Fig. 1.

As will be seen in these figures, the speed indicator comprises a measuring system provided with a wheel or torsion pendulum 1 acted upon by a spiral spring 2 and oscillating about a pivot 3. As will be seen in Fig. 2 the wheel 1 may be provided with a finger or transversely projecting pin 4 engaging a fork 5 which fork is rigidly mounted upon the auxiliary spindle 6. At the forward end of said spindle (to the right in Fig. 2) an index finger 7 is mounted. An oscillating lever or pawl 8 loosely articulated at 9 near the wheel 1 is provided with an opening $8^1$ which encompasses a cam 10 rotated in accordance with the movement of the element the speed of which is to be measured. The cam acts upon the lever or pawl 8 in such a manner as to produce a movement therein having both vertical and horizontal components. The lever or pawl 8 as shown in Fig. 1, is acted upon by a spring 11 tending to press it against the periphery of the measuring wheel 1, and also urging the lever toward the right. The lever 8 is also provided with a groove $8^2$ permitting through the elastic distortion of the projection $8^3$ produced by a screw 12, the control of the downward movement of the lever 8 under action of cam 10.

It will be easily understood that the action of the cam and spring will impart to the lever 8 a reciprocating movement and also cause it to disengage the wheel 1 with which the lever frictionally contacts whenever one of the high spots $10^2$ on the cam engages the projection $8^3$. The friction of the lever upon the wheel 1 will produce predetermined constant advance movements of said wheel followed by periods of disengagement during which the action of the spiral spring 2 tends to bring the wheel back to its first position. It will therefore be evident for instance that when the speed of the moving body is on the increase, the intervals of time between the passage of the cam projections $10^2$ will decrease gradually and that consequently the value of the negative oscillations of the wheel under the action of the spiral spring will decrease. This will result in a forward movement of the measuring system and consequently of the index 7 up to the new position of equilibrium corresponding to the speed. The cam spindle $10^1$ may be operated by means of any appropriate drive proceeding from the moving element, such as a flexible shaft transmission or any other driving means whereby corresponding movements of the cam and the moving element, the speed of which is to be measured, will be insured.

An alternate driving means may consist in mounting a magnetically propelled rotor on said spindle employing electric connections of the type described in my United States application dated September 22nd, 1926, Ser. No. 137,154.

The spindles 3 and 10' of the measuring wheel and of the cam 10 respectively are supported in frame 13, rotatable upon a pivot 3, a sector 14 having an arm 14' is mounted, a pin 15 projecting from said arm providing an anchorage for the outer end of the spiral spring. The sector 14 is provided with teeth 16 engaging a pinion 17 formed upon a removable key 18. To adjust the tension of the spring the small hub projection $17^1$ of the key is inserted in the hole 19 formed in the frame or bridge 13 and rotated, thereby swinging the spring adjusting sector 16. The sector may be maintained in a desired adjustment solely through the friction of its mounting or in any manner whereby to insure the permanency of an adjustment.

While I have illustrated the preferred embodiments of the invention it will be understood that such changes may be made as will fall within the scope of the appended claims.

What I claim is:—

1. A speed indicating apparatus comprising a rotatable speed measuring member having an arcuate working surface, a spring tending to restore said member to the position corresponding to zero speed, an oscillating pawl adapted to intermittently engage the said working surface of the speed measuring member, resilient means tending to engage the pawl with the working surface of the speed measuring member and also tending to move said pawl along said surface from a definite starting position whereby to advance said member, and a cam driven in accordance with the speed which is to be measured and controlling the movement of said pawl, said cam being adapted to positively disengage the pawl from said surface and during such disengagement to return the pawl against the action of said resilient means towards the starting position.

2. A speed indicating apparatus comprising a speed measuring wheel, a pawl cooperating therewith and mounted for radial and tangential movement, means for limiting the tangential movement, a spring tending to move said wheel toward the position corresponding to zero speed, a pawl actuating cam rotating in accordance with the speed which is to be measured adapted to periodically disengage said pawl from the wheel and to move the pawl tangentially of the wheel during such disengagement, and a pawl return spring adapted, after each positive actuation of the pawl by the said cam, to move the pawl into contact with the wheel and advance it tangentially to impart to the wheel a succession of forward impulses between each of which the wheel is free to rotate backwardly in accordance with the tension of the spring connected therewith.

3. A speed indicating apparatus comprising a speed measuring wheel, a pawl cooperating therewith and mounted for radial and tangential movement, said pawl having two cam engaging surfaces, means for limiting the tangential movement of the pawl, a spring tending to move said wheel towards the position corresponding to zero speed, a pawl actuating cam rotating in accordance with the speed which is to be measured, said cam engaging one of the surfaces of the pawl to move the pawl radially away from the wheel and engaging the other surface of the pawl to move the pawl tangentially of the wheel during such disengagement, and a pawl return spring adapted, after each positive actuation of the pawl by the cam, to move the pawl into contact with the wheel and advance it tangentially to impart to the wheel a succession of forward impulses between each of which the wheel is free to rotate backwardly in accordance with the tension of the spring connected therewith.

4. A speed indicating apparatus comprising a speed measuring wheel, a pawl cooperating therewith and mounted for radial and tangential movement, said pawl having two cam engaging surfaces, means for limiting the tangential movement of the pawl, a spring tending to move said wheel towards the position corresponding to zero speed, a pawl actuating cam rotating in accordance with the speed which is to be measured, said cam engaging one of the surfaces of the pawl to move the pawl radially away from the wheel and engaging the other surface of the pawl to move the pawl tangentially of the wheel during such disengagement, adjusting means carried by the pawl and adapted to vary the distance of one of the cam engaging surfaces radially of the measuring wheel whereby for any given speed the period of engagement of the pawl with the wheel may be varied, and a pawl return spring adapted, after each positive actuation of the pawl by the cam, to move the pawl into contact with the wheel and advance it tangentially to impart to the wheel a succession of forward impulses between each of which the wheel is free to rotate backwardly in accordance with the tension of the spring connected therewith.

5. A speed indicating apparatus comprising a speed measuring wheel, a pawl cooperating therewith and mounted for radial and tangential movement, said pawl having an opening therein and a slot extending from one end and intersecting the opening, adjusting means for that portion of the pawl below the slot, means for limiting the tangential movement of the pawl, a spring tending to move said wheel toward the position corresponding to zero speed, a pawl actuating cam received in the opening of the pawl and rotating in accordance with the speed which is to be measured to periodically disengage the pawl from the wheel and to move the pawl tangentially of the wheel during such disengagement, and a pawl return spring adapted, after each positive actuation of the pawl by the cam, to move the pawl into contact with the wheel and advance it tangentially to impart to the wheel a succession of forward impulses between each of which the wheel is free to rotate backwardly in accordance with the tension of the spring connected therewith.

In witness whereof, I have hereunto signed my name.

GEORGES MOMBUR.